THROTTLE CONTROL DEVICE WITH OPTIONAL CHANGEOVER MEANS FOR "SMOG" CONTROL
Original Filed Jan. 10, 1966 4 Sheets-Sheet 1
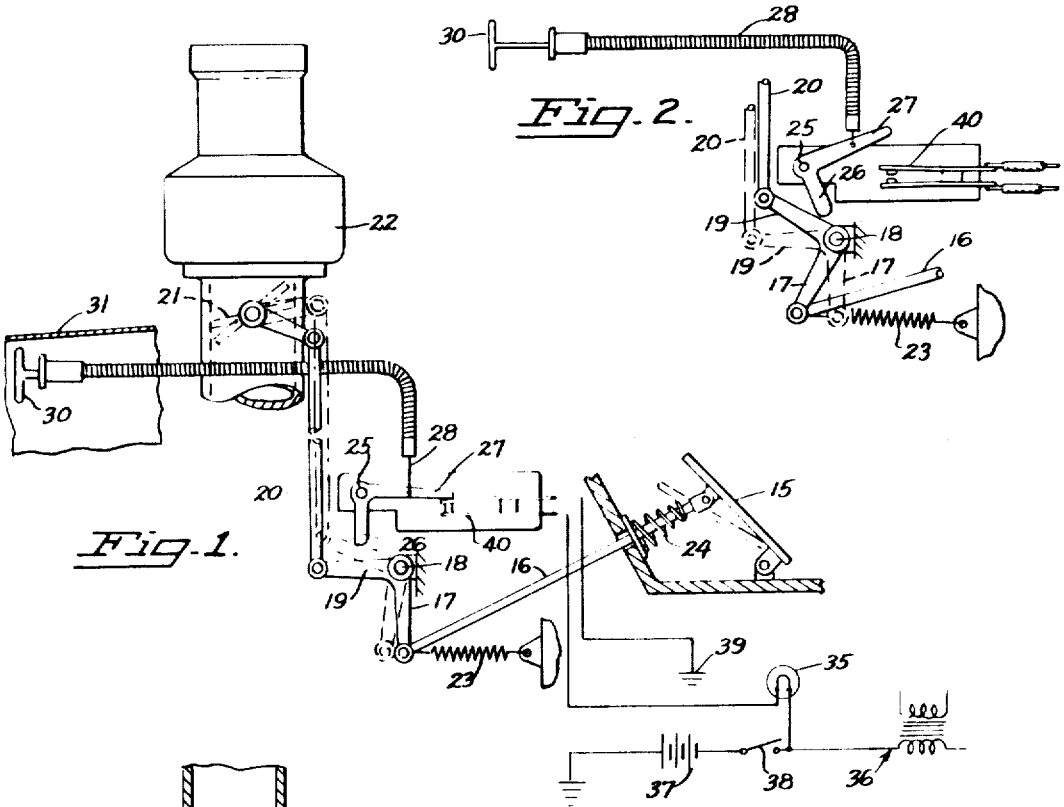
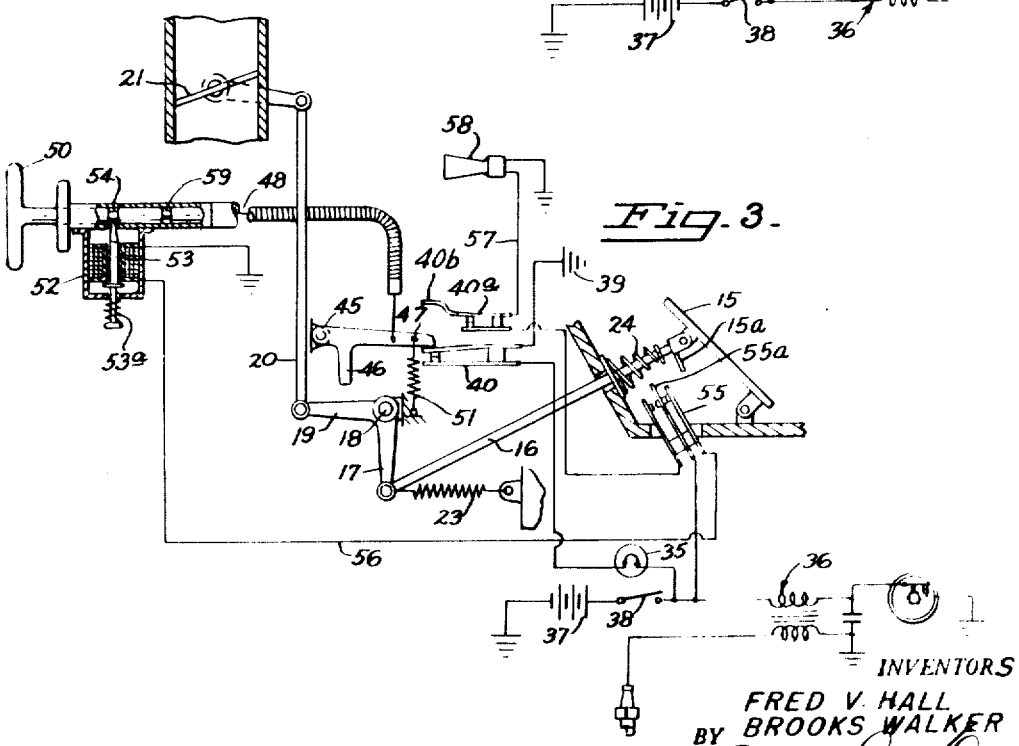
INVENTORS
FRED V. HALL
BY BROOKS WALKER
ATTORNEY.

INVENTORS
FRED V. HALL
BROOKS WALKER
BY A. Donham Owen
ATTORNEY.

THROTTLE CONTROL DEVICE WITH OPTIONAL CHANGEOVER MEANS FOR "SMOG" CONTROL

Original Filed Jan. 10, 1966 4 Sheets-Sheet 1

INVENTORS
FRED V. HALL
BROOKS WALKER
BY
ATTORNEY

THROTTLE CONTROL DEVICE WITH OPTIONAL CHANGEOVER MEANS FOR "SMOG" CONTROL
Original Filed Jan. 10, 1966 4 Sheets-Sheet 4
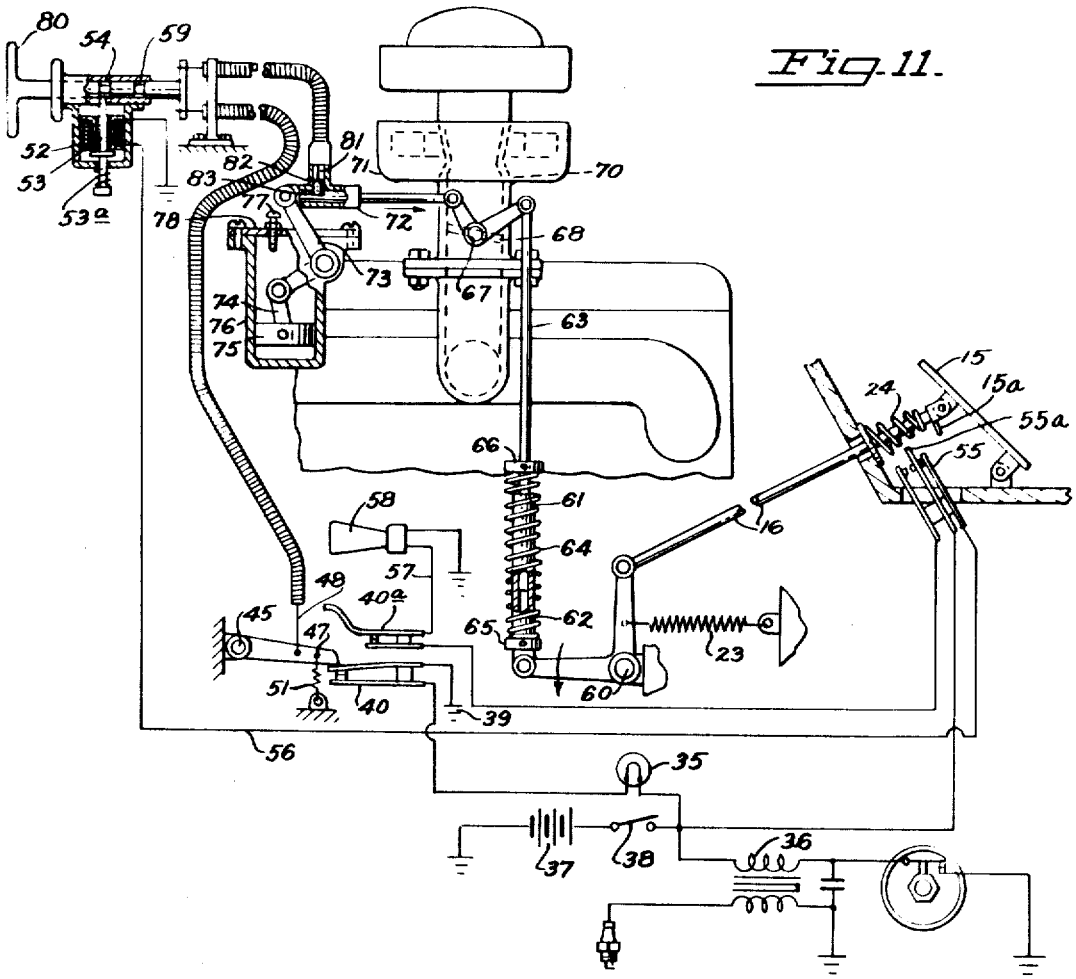
INVENTORS
FRED V. HALL
BROOKS WALKER
BY
ATTORNEY United States Patent Office Re. 26,985
Reissued Nov. 24, 1970

26,985

THROTTLE CONTROL DEVICE WITH OPTIONAL CHANGEOVER MEANS FOR "SMOG" CONTROL

Brooks Walker, 807 Francisco St., San Francisco, Calif. 94109, and Fred V. Hall, San Francisco, Calif.; said Hall assignor to said Walker Original No. 3,366,194, dated Jan. 30, 1968, Ser. No. 530,754, Aug. 18, 1960, which is a continuation-in-part of Ser. No. 50,367, Aug. 18, 1960. Application for reissue Feb. 14, 1969, Ser. No. 802,292
Int. Cl. B60k *27/06*
U.S. Cl. 180—77 7 Claims

Matter enclosed in heavy brackets [ ] appears in the original patent but forms no part of this reissue specification; matter printed in italics indicates the additions made by reissue.

*ABSTRACT OF THE DISCLOSURE*

*A throttle control device with optional changeover means for smog control comprising a pair of carburetors and means for selecting one or the other carburetors for engine control. One of the carburetors has sufficient capacity to provide full engine performance and the other carburetor has a lesser capacity for providing restricted engine performance. In one form of the invention the selector means is inaccessible to the driver while operating the vehicle. A signal device is provided to indicate the operative condition of the carburetor.*

This application is a continuation-in-part of application Ser. No. 50,367, filed Aug. 18, 1960, and since abandoned.

This invention relates to throttle-control mechanisms for automobiles and to their use in areas having smog-control laws. More particularly, it relates to throttle-control mechanisms having activation and deactivation means controllable only in a particular manner and having means observable from the outside of the automobile indicating whether the throttle-control mechanisms are activated or not.

In Hall Patent 2,809,623 a control device for carburetor-type internal combustion engines is illustrated, described, and claimed. The main purpose of that invention is to prevent the excessive exhaustion of unburned hydrocarbons and carbon monoxide into the atmosphere, where they are liable to produce smog. Of great importance in the Hall invention are throttle-control mechanisms which control the rate of opening and closing of the throttle, and a stop that prevents full opening of the throttle. The purposes of the throttle stop are to limit full throttle operation, with its attendant rich mixtures and high air flow, and to prevent drivers from operating their engines in ways conducive to spark plug misfire, for this can be a major cause of excessive unburned hydrocarbons in the exhaust. Engines that may operate quite satisfactorily on light and moderate throttle openings will often misfire rather severely at high power output, especially if they contain combustion chamber deposits in quantities sufficient to foul the spark plugs. This is particularly so when engines are driven in the stop-and-go city type of driving. This misfiring may be unnoticed by the driver because the engine speed is high enough so that the engine noise level may mask the misfiring, but it can be readily observed on a chassis dynamometer by watching the tail pipe, for, under full throttle, many irregularly spaced puffs indicate that there is misfire. Such puffs will be observed on most automobiles under full load operation, if a dynamometer is used.

When unburned hydrocarbons are emitted into the atmosphere in quantities, as they are in large cities where there are hundreds of thousands or even millions of automobiles, the result under certain atmospheric conditions is a very bad type of smog capable of causing eye irritation and other problems. Thus, improper use of the throttle is a significant contributing cause of smog conditions.

Most modern automobiles possess performance capabilities far in excess of those needed for satisfactory urban driving. The intention is to give the vehicle an ability to accelerate quickly. While few people use full-throttle acceleration from standstill, many of them do so when accelerating from speeds of thirty or forty miles an hour, with a resultant reduction in gasoline mileage and a great increase in the emission of unburned hydrocarbons and carbon monoxide from the exhaust. Full throttle acceleration is unnecessary in city driving and is better prevented, as with this invention, especially when climatic conditions obtain that are conducive to smog formation. A considerable fuel saving results from these throttle restrictions, and some drivers may prefer to operate with these restrictions in order to obtain these savings, even under conditions where smog formation is unlikely.

However, in highway and cross-country driving, many drivers like to be able to use full throttle and would also like to remove the restrictions on the rate of opening and closing of the throttle in order to get full power performance. Full performance conditions may be needed in the mountains on long grades, for example, or in other places where smog control is unnecessary, for passing other cars, trucks, etc. Hence, the present invention makes it possible to utilize the various smog-control throttle mechanisms where smog control is needed and to use full throttle with unrestricted throttle action at other times. Furthermore, since air-pollution-control authorities should know whether drivers are obeying the smog laws, the present invention provides an indicator observable from outside the car so that an observer can tell whether or not the throttle is being governed. It also provides arrangements whereby the throttle stop cannot be activated and deactivated in a capricious manner, in accordance with the whims of the driver, for this would defeat the basic purposes of smog control.

Other objects and advantages of the invention will appear from the following description of a preferred embodiment.

In the drawings:

FIG. 1 is a view in side elevation and partly in section of an automotive throttle-stop mechanism employing the principles of the invention and shown in throttle-governed position. Broken lines indicate the maximum depression of the throttle and its levers.

FIG. 2 is a fragmentary view of a portion of FIG. 1 showing the mechanism in its ungoverned position with the throttle fully depressed, broken lines indicating the fully retracted position of the throttle.

FIG. 3 is a view like FIG. 1 of a modified form of the invention providing for a momentary use of full throttle, along with a signal showing that full throttle is being used.

FIG. 11 is a view similar to FIG. 4 of another modified form of the invention, wherein the circuit of FIG. 3 is combined with the type of apparatus shown in FIG. 4.

Figure 4:
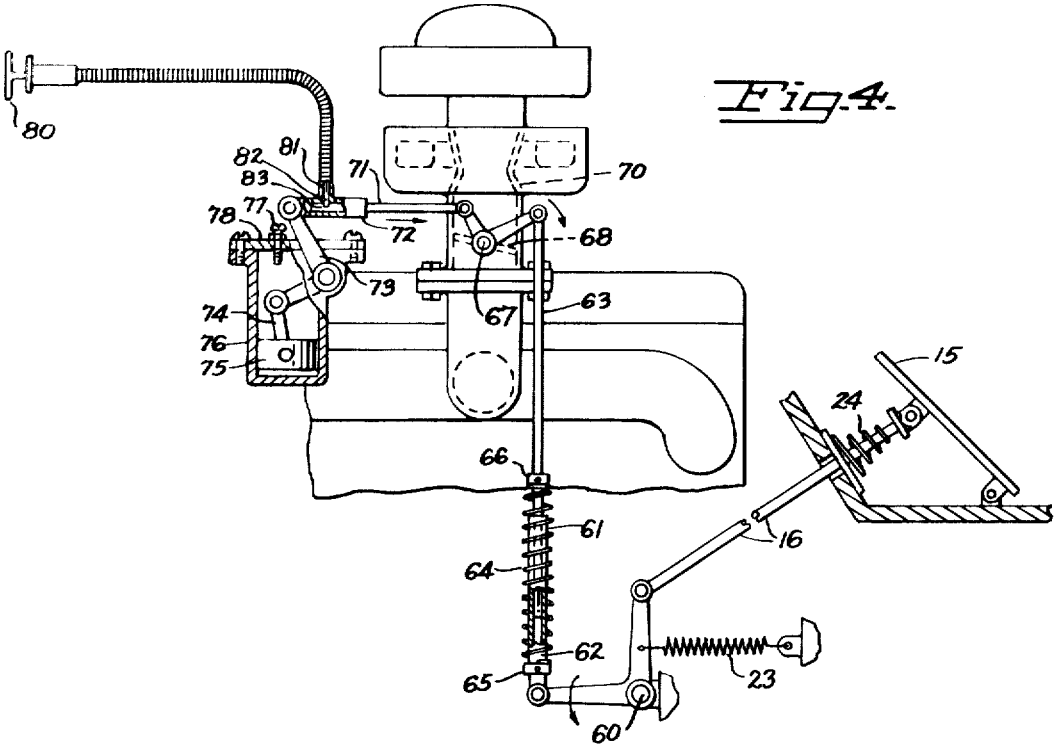
FIG. 4 is a view similar to FIGS. 1 and 2 of a modified form of apparatus embodying the invention and employing a Hall-type carburetor with the stop mechanism being located as part of the dashpot control.

FIGS. 1–3 show a throttle pedal 15 pivoted to a lever 16, which is pivotally secured to one arm 17 of a pivotally-mounted crank 18. The other arm 19 of the crank 18 is connected to a rod or throttle lever 20, which controls a throttle or butterfly valve 21 of a carburetor 22. (As shown in FIG. 4, the rod 20 may have the soft link construction shown in Hall Patent 2,809,623, if desired.) A return spring 23 is also connected to the crank arm 17, and a heavy spring 24 is used to urge the throttle pedal 15 toward its upper or closed position at wide-open or heavy-throttle openings, to discourage such use. The mechanism so far described represents an arrangement disclosed in the Hall Patent 2,809,623.

Figure 5:
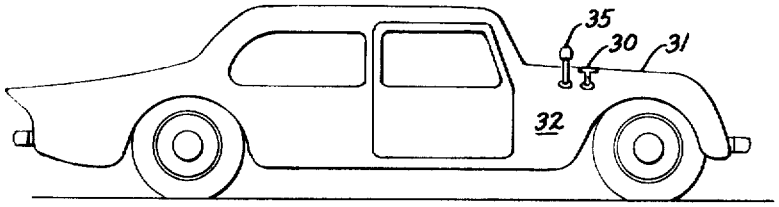
FIG. 5 is a view in side elevation of an automobile having an external signal light and an external optional deactivation control lever mounted on one fender.
Figure 6:
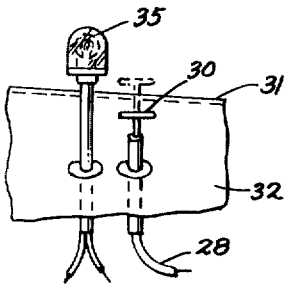
FIG. 6 is an enlarged view of a portion of FIG. 1 showing additional details of the signal light and deactivation control levers.

In the form of the present invention shown in FIGS. 1 and 2 a second pivotally mounted crank 25 is provided, having an arm 26 that, when vertical, serves as a throttle stop and an arm 27 to which is connected a control cable 28 having a handle 30 for activating (FIG. 1) or deactivating (FIG. 2) the throttle stop 26. The handle 30 is preferably located under the hood 31 (FIG. 1) or externally on the side or front (FIG. 5) of the automobile, where the driver has no access while driving, though it may be located on the dashboard in any instance where that really is desired. The location of the handle [31] *30* may be determined by state or federal authorities for best inspection for compliance with smog control. If located under the hood 31, the handle 30 can be operated only by stopping the car, raising the hood 31, and pulling or pushing the handle 30; so the driver is encouraged to leave the throttle stop 26 in active position, while if it is on the dashboard, some drivers may try to use the stop mechanism only when they feel they are being watched. If located externally on the side or front of the car, as on the fender 32 in FIGS. 5 and 6, it is still necessary to stop the car and get out in order to operate the throttle stop mechanism, although it is not necessary to raise the hood 31.

When the handle 30 is pulled, the crank 25 is turned so that the stop arm 26 is out of position and has no effect on the throttle crank 18, whereas when the handle 30 is pushed in, the crank arm 26 is in position for stopping the throttle crank 18 short of the full throttle position of the rod 20.

In conjunction with this system, a signal lamp 35 may be provided in a location where it is readily observable from outside the car. The lamp 35 may light a signal indicator which says "Smog Control On" or a simple color code may be used to show that the smog-control throttle stop is in operation. The signal lamp 35 may be wired in parallel with the ignition circuit 36 of the engine so that current from the battery 37 will flow through the ignition switch 38 to the signal lamp 35 when the ignition switch 38 is closed. However, the ground 39 for the signal lamp 35 is separated from the lamp itself by a switch 40 that is normally open; so the lamp 35 will not light unless the switch 40 is closed. However, when the throttle stop 26 is in active position (FIG. 1), the other arm 27 of the crank 25 closes the switch 40; and therefore lights the signal lamp 35 if the engine is running. When the throttle stop 26 is deactivated (FIG. 2), the arm 27 opens the switch 40. Thereby, any observer such as a control-district officer outside the car can ascertain whether the particular vehicle is operating with or without throttle restriction. (The on-off arrangement may be reversed, if desired.)

Thus, during the smog season or while driving in controlled-district areas, all vehicles equipped with this invention should exhibit a lighted signal light 35 whenever the engine is running. The light 35 may be similar to that used by taxicabs to indicate whether or not they are available to pick up a passenger, or may be any other suitable device decided upon by the control district. Where the control handle 30 is under the hood 31 or externally on the front or side of the car, it cannot be operated from within the car, the driver is committed once he gets into the vehicle, and he cannot change the control at will to avoid surveillance of traffic officers or air pollution control district inspectors. The invention thus makes it possible for the driver to change from a full-throttle system to a partial-throttle system, but not while he is driving if the handle 30 of the control apparatus is under the hood 31 or externally on the side, front, or rear of the car.

In another form of the present invention shown in FIG. 3, a system is provided whereby the driver can, in an emergency, override the throttle governor. Once again, a second pivotally mounted crank 45 is provided, having an arm 46 that, when vertical, serves as a throttle stop and an arm 47 to which is connected a control cable 48 having a handle 50 for activating or deactivating the throttle stop, again preferably located under the hood 31. A spring 51 urges the arm 47 downward and therefore tends to return the throttle stop 46 to its activated position. The switch 40 and lamp 35 are arranged as before.

In this instance the handle 50 and cable 48 are locked in governing position by a normally energized solenoid 52 having a core 53 that is mounted on a spring 53a for normal engagement in a notch 54 to prevent the cable 48 from being moved. However, if the driver tramps down hard on the pedal 15, a projection 15a engages a switch projection 55a and trips a switch 55 that de-energizes the solenoid 52 by opening a circuit 56 in parallel with the ignition circuit, thereby causing a spring 53a to retract the core 53 from the notch 54 so that the lever arm 19 can force the lever 45 to rotate around rather than limiting the movement of the arm 19. The return spring 51 forces the throttle stop back into position after the override period is terminated. Additionally, activation of the switch 55 closes a circuit 57 in parallel with the ignition circuit to sound a horn 58 or other warning device indicating that this driver is momentarily off smog control. A switch 40a comprises a second set of contacts mechanically connected to the springy lever 40b engageable by the arm 47 and is used to deactuate the horn signal when the full throttle is used and the throttle stop is not in its effective position, the contacts of the switch 40a being moved apart by the arm 47 when the handle 50 is pulled out and locked in its outer position. However, the switch 40a is not opened when the handle 50 is pushed in and locked in its governing position, because the arm 47 is not moved far enough even when the driver presses the pedal 15 all the way to the floor. The horn 58 discourages the driver from using the override device indiscriminately, while permitting him to use it briefly in an emergency. When driving without the throttle control, the core 53 is locked in a second notch 59, the handle 50 being moved when the ignition is off. Then the born 58 will not sound in any position of the foot throttle pedal 15.

The device in FIG. 4 shows a throttle pedal 15 having its lever 16 attached to a crank 60 like the crank 18. The crank 60 operates through a soft link 61 of the type shown in the Hall Patent 2,809,623. In other words, the crank 60 is attached to a sleeve 62 which surrounds a rod 63; a spring 64 is mounted around the sleeve 62 and is attached at one end 65 to the sleeve 62 and at the other end 66 to the rod 63. Hence, the spring 64 is in tension and is pulled further apart when the pedal 15 is depressed. The rod 63 is attached to a crank 67 which operates the throttle butterfly 68 in the carburetor 70. The other end of the crank 67 is attached to a rod 71 which in turn is slidable within a sleeve 72 attached to a crank 73. The crank 73 is attached by a rod 74 to a dashpot piston 75 moving in a dashpot cylinder 76. A throttle stop 77 is provided in the head 78 of the dashpot cylinder 76 and is adjusted manually as by a screw.

The throttle control 77 is put into or out of effect by use of a handle 80 attached to a cable 81 that has a detent 82 which engages a groove 83 to lock the rod 71 and sleeve 72 together or, when withdrawn by pulling on the handle 80 to permit the rod 71 to move freely relative to the sleeve 72. It will be obvious that when the detent 82 is withdrawn from its lock 83, the dashpot piston 75 will be inactivated and so will the throttle stop 77, whereas when the handle 80 is pushed in, the sleeve 72 and rod 71 will move together, and the dashpot piston 75 and throttle stop 77 will both be in operation. By once again having the control handle 80 under the hood 31 or at some other point unavailable to the driver while he is driving or to anyone else in the car, it is possible to maintain the control mechanism in a foolproof configuration.

FIG. 11 is basically a combination of FIGS. 3 and 4 and therefore uses the same reference numerals. Here, the signal-light circuit and horn circuit are combined with the soft-link structure of FIG. 4.

Figure 7:
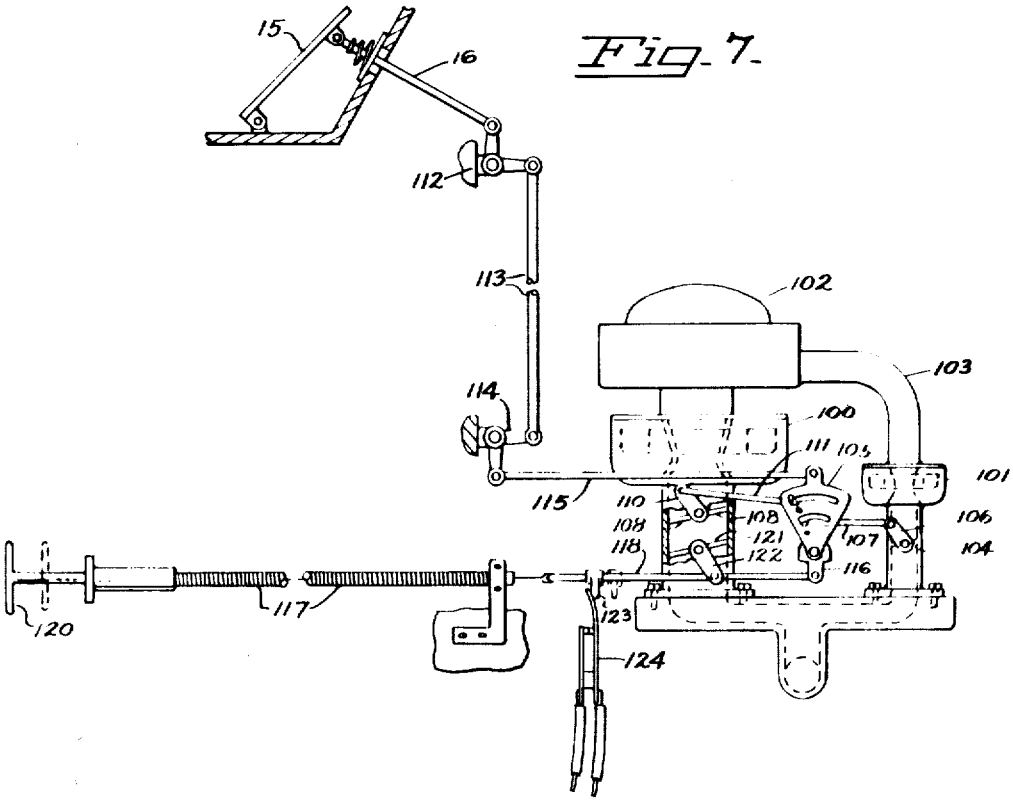
FIG. 7 is a view in elevation of a modified form of apparatus employing a two-carburetor arrangement in which a large standard carburetor and a small Hall-type carburetor employing the controls described in Patent 2,809,623 are both installed on the car and used alternately, as determined by controls that shift from one carburetor to the other.

FIG. 7 shows a standard carburetor 100 and a smog control carburetor 101 such as that disclosed in the Hall Patent 2,809,623, linked together for alternate use, the Hall carburetor 101 having a throttle control mechanism. A single air cleaner 102 may be used for both carburetors, being connected by a duct 103 to the smog control carburetor 101. A throttle valve 104 of the smog control carburetor 101 is connected to a pivotally mounted clutch quadrant 105 through a crank 106 and a rod 107. A standard carburetor throttle 108 is connected to the clutch quadrant 105 through a crank 110 and a rod 111. The clutch quadrant 105 is connected to an accelerator pedal 15 through the rod 16, a bell crank 112, a rod 113, a crank 114, and a rod 115. A pivotally mounted cam plate 116 is connected to a flexible cable 117 by a rod 118, and therefore the position of the plate 116 is controlled by a handle 120 on the cable 117. The cable 117 also controls a main carburetor shutoff valve 121 through a crank 122. The rod 118 also carries a tab 123 which operates a switch 124 for controlling the light signal, corresponding to the switch 40.

Figure 8:
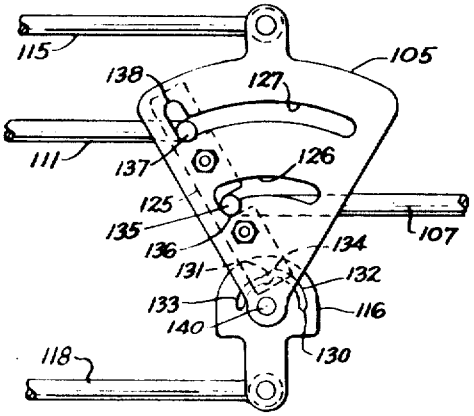
FIG. 8 is an enlarged view in elevation of a portion of the clutching mechanism for shifting from one carburetor to the other in the device of FIG. 7.
Figure 9:
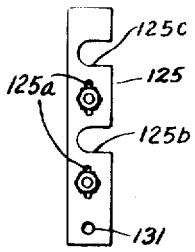
FIG. 9 is a view in front elevation of the shifting plate in the clutching mechanism of FIG. 8.
Figure 10:
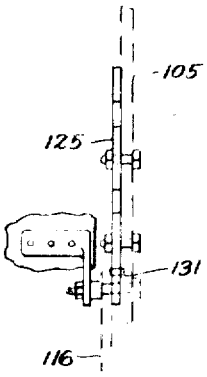
FIG. 10 is a view in side elevation of the clutching mechanism, showing the relative positions of the quadrant, shifting plate, and shifting cams.

FIGS. 8 to 10 show the clutch quadrant 105 and a slidable clutch plate 125 in more detail. The slidable clutch plate 125 controls the position of the rods 107 and 111 with respect to arcuate slots 126 and 127 in the clutch quadrant 105. The cam plate 116 has a cam slot 130 in which a pin 131 slides. The cam slot 130 has two arcuate portions 132 and 133 joined by a connecting portion 134. The member 125 slides axially by means of slots 125a. Cut outs 125b and 125c enable the rod ends 136 and 137 to slide out into the grooves 126 and 127 as the position of the cam 116 changes. When the handle 120 is pulled out to its position shown in solid lines in FIG. 7, the pin 131 rides in the outer slot portion 133 causing the clutch plate 125 to move radially inwardly so as to lock a pin 135 on the rod 107 in a latch 136 on the slot 126, while a pin 137 on the rod 111 is disengaged from its latch 138 in the slot 127 and slides freely in the slot 127. This means that when the pedal 15 is depressed and the rod 115 moves the quadrant 105 on its pivot 140, the rod 111 is unaffected, while the rod 107 moves with the quadrant 105. In other words, the smog-control carburetor 101 is operated, while the big carburetor 100 is closed. When the handle 120 is pushed in to its broken line position, the carburetor 101 is closed and the carburetor 100 is in use.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A vehicle having an engine, first carburetor means associated with said engine and having sufficient capacity for providing full engine performance with a resulting tendency to contribute to smog forming conditions, a second carburetor means associated with said engine and having less capacity than said first carburetor means for providing restricted engine performance with a resulting reduced tendency to contribute to smog formation, throttle means associated with each said carburetor means for controlling the flow of fuel therethrough, first means connected with the throttle means of each said carburetor means for selectively actuating each said throttle means, and means inaccessible to the driver while operating the vehicle and connected to said first means for operating each said throttle means to selectively operate each carburetor means as the sole carburetor means for said engine whereby the second carburetor means when used as the sole carburetor means provides restricted engine performance to reduce smog formation.

2. An apparatus as defined in claim 1 wherein the first means comprises a clutch and means for operating the clutch.

3. An apparatus as defined in claim 2 wherein the clutch comprises a pivotally mounted segment, radially disposed concentric arcuate slots in the segment, a radially outwardly extending notch at one end of the outer slot, a radially inwardly extending notch at one end of the inner slot, a plate slidably mounted on the quadrant in alignment with the notches, and said means for operating the clutch includes means for radially shifting the plate.

4. An apparatus as defined in claim 2 further including an indicator on said vehicle which when energized indicates the operative condition of said carburetor of lesser capacity, an electric circuit for said indicator, a switch in said circuit, and means carried by said inaccessible means for operating the switch when said carburetor of lesser capacity is placed in operative condition thereby energizing said indicator.

*5. A vehicle having an engine, first carburetor means associated with said engine and having sufficient capacity for providing full engine performance with a resulting tendency to contribute to smog forming conditions, a second carburetor means associated with said engine and having less capacity than said first carburetor means for providing restricted engine performance with a resulting reduced tendency to contribute to smog formation, throttle means associated with each said carburetor means for controlling the flow of fuel therethrough, first means connected with the throttle means of each said carburetor means for selectively actuating each said throttle means, and means connected to said first means for operating each said throttle means to selectively operate each carburetor means as the sole carburetor means for said engine whereby the second carburetor means when used as the sole carburetor means provides restricted engine performance to reduce smog formation.*

*6. An apparatus as defined in claim 5 further including means carried by the vehicle for indicating the operative condition of one of said carburetor means.*

*7. An apparatus as defined in claim 6 wherein the indicating means comprises an electric signal which when energized indicates the operative condition of said carburetor of lesser capacity, an electric circuit for said indicator, a switch in said circuit, and means carried by said means connected to said first means for operating the switch when said carburetor of lesser capacity is placed in operative condition thereby energizing the indicator.*

References Cited

The following references, cited by the Examiner, are of record in the patented file of this patent or the original patent.

UNITED STATES PATENTS

| | | | |
|---|---|---|---|
| 1,341,762 | 6/1920 | Ross | 123—98 |
| 1,351,832 | 9/1920 | Brickey | 123—98 |
| 1,541,851 | 6/1925 | Ristau | 123—127 |
| 2,328,763 | 9/1943 | Winkler | 123—127 |
| 2,460,046 | 1/1949 | Vincent | 123—127 |
| 2,809,623 | 10/1957 | Hall | 123—179 |
| 2,866,446 | 12/1958 | Feuerstein et al. | 180—77 |

A. HARRY LEVY, Primary Examiner

U.S. Cl. X.R.

123—127, 179; 180—82; 340—52